United States Patent
Stepura et al.

(10) Patent No.: US 11,554,847 B2
(45) Date of Patent: Jan. 17, 2023

(54) LOCK APPARATUS AND RELATED METHODS FOR USE WITH DRONES

(71) Applicant: Skyeton USA Inc., Lewes, DE (US)

(72) Inventors: Oleksandr Volodymyrovych Stepura, Kyivo-Svyatoshynskyy raion (UA); Mykola Mykolaiovytch Toptun, Brovarskyy raion (UA)

(73) Assignee: Skyeton USA Inc., Lewes, DE (US)

( * ) Notice: Subject to any disclaimer, the term of this patent is extended or adjusted under 35 U.S.C. 154(b) by 392 days.

(21) Appl. No.: 16/804,755

(22) Filed: Feb. 28, 2020

(65) Prior Publication Data

US 2021/0269141 A1    Sep. 2, 2021

(51) Int. Cl.
   *B64C 1/26*     (2006.01)
   *E05C 3/00*     (2006.01)
   *B64C 39/04*    (2006.01)
   *B64C 39/02*    (2006.01)

(52) U.S. Cl.
   CPC .............. *B64C 1/26* (2013.01); *B64C 39/04* (2013.01); *E05C 3/004* (2013.01); *B64C 39/024* (2013.01); *B64C 2201/104* (2013.01)

(58) Field of Classification Search
   CPC ..... B64C 39/024; B64C 1/26; B64C 2211/00; B64C 2201/20; B64C 2201/201; B64C 2201/104; B64C 39/04; Y10T 403/597; Y10T 403/608; Y10T 403/60; Y10T 403/602; E05C 3/22
   See application file for complete search history.

(56) References Cited

U.S. PATENT DOCUMENTS

| | | | | |
|---|---|---|---|---|
| 5,941,478 A | * | 8/1999 | Schmittle | B64C 1/00 244/131 |
| 9,902,489 B2 | * | 2/2018 | Fisher | B64C 5/02 |
| 11,292,596 B2 | * | 4/2022 | Grubb | B64C 9/18 |
| 2014/0312169 A1 | * | 10/2014 | Fisher | B64C 39/12 244/89 |
| 2019/0168872 A1 | * | 6/2019 | Grubb | B64D 47/08 |

FOREIGN PATENT DOCUMENTS

| | | | | |
|---|---|---|---|---|
| CN | 109515706 A | | 3/2019 | |
| CN | 111661361 A | | 9/2020 | |
| CN | 111683872 A | | 9/2020 | |
| FR | 1059020 A | * | 3/1954 | ........... B64C 39/024 |
| WO | WO 2018/076470 A1 | | 5/2018 | |
| WO | WO-2018076470 A1 | * | 5/2018 | ............... B64C 1/06 |

OTHER PUBLICATIONS

International Search Report and Written Opinion of the International Searching Authority dated May 6, 2021 in PCT/US21/18461, 12 pages.

* cited by examiner

*Primary Examiner* — Joshua J Michener
*Assistant Examiner* — Arfan Y. Sinaki
(74) *Attorney, Agent, or Firm* — Oblon, McClelland, Maier & Neustadt, L.L.P.

(57) ABSTRACT

Lock apparatus and related methods for use with drones are disclosed. A disclosed drone assembly includes a wing, a keel-beam, an adapter positioned on an end of the keel-beam, and a lock configured to receive the adapter. The lock includes a first lock portion coupled to the wing and a second lock portion rotatable relative to the first lock portion between a first position and a second position. The lock is configured to (a) couple the keel-beam to the wing when the second lock portion is in the second position and (b) decouple the keel-beam from the wing when the second lock portion is in the first position.

18 Claims, 12 Drawing Sheets

LOCK APPARATUS AND RELATED METHODS FOR USE WITH DRONES

FIELD OF THE DISCLOSURE

This disclosure relates generally to drones and, more particularly, to lock apparatus and related methods for use with drones.

BACKGROUND

Drones, such as unmanned aerial vehicles (UAVs), typically employ fastening mechanisms to maintain connections between different drone components. Often, these drone components are fixedly coupled together via fasteners and fastening methods such as welding.

SUMMARY

An aspect of the present disclosure includes a drone assembly. The drone assembly includes a wing, a keel-beam, an adapter positioned on an end of the keel-beam, and a lock configured to receive the adapter. The lock includes a first lock portion coupled to the wing and a second lock portion rotatable relative to the first lock portion between a first position and a second position. The lock is configured to (a) couple the keel-beam to the wing when the second lock portion is in the second position and (b) decouple the keel-beam from the wing when the second lock portion is in the first position In a further aspect of the present disclosure, the adapter includes a hook configured to engage the second lock portion when the second lock portion is in the second position.

In a further aspect of the present disclosure, the second lock portion forms a slot extending transversely through the second lock portion. The hook is movable through the slot when the second lock portion is in the first position.

In a further aspect of the present disclosure, the first lock portion includes an inner space in which the second lock portion is positioned.

In a further aspect of the present disclosure, the second lock portion includes a spring cavity extending at least partially through the second lock portion along an axis. The lock includes a spring disposed in the spring cavity and a clamp interposed between the spring and the first lock portion. The spring urges the clamp into engagement with the first lock portion to resist rotational displacement of the second lock portion relative to the first lock portion.

In a further aspect of the present disclosure, the lock includes a locking ring operatively coupled between the first lock portion and the second lock portion. The locking ring is configured to engage the first and second lock portions to resist axial displacement of the second lock portion relative to the first lock portion.

In a further aspect of the present disclosure, the first lock portion forms a guide groove configured to guide movement the clamp. The clamp is configured to slide through the guide groove between a first end of the guide groove and a second end of the guide groove as the second lock portion moves between the first position and the second position.

In a further aspect of the present disclosure, the first and second ends of the guide groove extend deeper into the first lock portion relative to an intermediate portion of the guide groove that is between the first and second ends. The clamp is engaged between the first and second lock portions when the clamp is positioned in the first or second end of the guide groove.

In a further aspect of the present disclosure, the clamp is configured to exit the first or second end of the guide groove when a torque applied to the second lock portion is equal to or greater than a required torque.

In a further aspect of the present disclosure, the lock comprises a lever coupled to the second lock portion and extending radially outward relative to a rotation axis. Actuation of the lever changes a position of the second lock portion.

In a further aspect of the present disclosure, the first and second lock portions are internal to the wing and the lever is external to the wing.

In a further aspect of the present disclosure, the second lock portion is rotatable across an angle that is substantially 180 degrees from the first position to the second position.

In a further aspect of the present disclosure, the drone assembly also includes a guide tube that is coupled to the wing and interposed between the lock and an opening formed by the wing. The guide tube is configured to guide the keel-beam as the adapter moves through the guide tube from the opening to the lock.

Another aspect of the present disclosure includes a lock mechanism for a drone. The lock mechanism includes an adapter coupled to a first component of the drone. The lock mechanism also includes a lock comprising a first portion positioned in a second component of the drone and a second portion rotatably coupled to the first portion. The second portion is configured to engage the adapter and disengage from the adapter based on a position of the second portion relative to the first portion. Rotation of the second portion of the lock relative to the first portion changes the lock between (a) a first state in which the lock couples the first component to the second component and (b) a second state in which the lock decouples the first component from the second component.

In a further aspect of the present disclosure, the first portion of the lock is rotatable relative to the second portion of the lock between a first position and a second position. The second portion of the lock is substantially immobile relative to the first portion in the first and second positions.

In a further aspect of the present disclosure, the lock includes a lever coupled to the second portion of the lock and extending radially outward relative to a rotation axis. Actuation of the lever changes the state of the lock.

In a further aspect of the present disclosure, the lever is external to the second component of the drone.

Another aspect of the present disclosure includes a method. The method includes inserting a keel-beam in an opening formed by a wing of a drone assembly. The method also includes positioning an adapter of the keel-beam proximate to a lock that is positioned in the wing of the drone assembly. The method also includes rotating a first portion of the lock relative to a second portion of the lock from an open position to a closed position to couple the keel-beam to the wing.

In a further aspect of the present disclosure, the method also includes checking a state of the lock and, if the first portion of the lock is in an initial position that is different from the open position, rotating the first portion of the lock relative to the second portion from the initial position to the open position prior to inserting the keel-beam in the opening.

In a further aspect of the present disclosure, the method also includes rotating the first portion of the lock relative to the second portion of the lock from the closed position to the open position to decouple the keel-beam from the wing.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figures 1A, 1B:
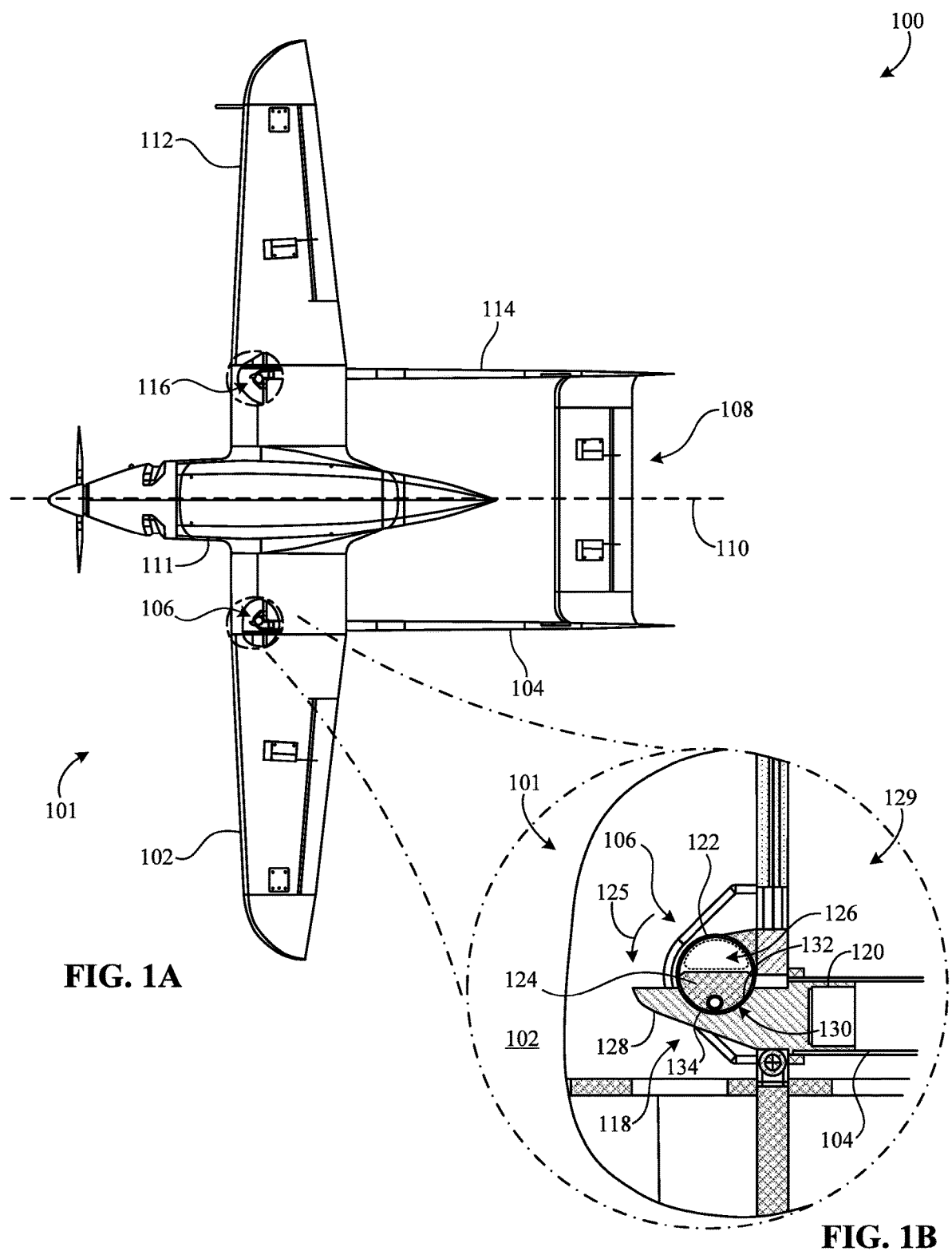
FIG. 1A is a view of an example drone in which examples disclosed herein can be implemented.
FIG. 1B is a partial cross-sectional view of a wing of the example drone of FIG. 1A and shows an implementation of an example lock in accordance with the teachings of this disclosure.

Some drones are configured to be manually assembled and disassembled by one or more users. Such drones can be stored efficiently and transported to and from a location of deployment. For example, prior to deployment, a drone may include multiple components, such as wings, a tail, a fuselage, etc. that are disconnected from each other. However, such drones may be difficult to assemble due to design complexity and/or specialized tools required for assembly. As a result, these drones are prone to user error, and a user may fail to properly connect the components. Further, these drones can be time consuming to assemble and disassemble, which is not desirable in certain applications.

Lock apparatus and related methods for use with drones are disclosed. Examples disclosed herein provide a compact, lightweight solution that enables one or more users to easily assemble and/or disassemble a drone (e.g., a UAV) or at least a portion thereof. Some disclosed examples provide a lock mechanism (e.g., a beam lock mechanism) for the drone including an example adapter (e.g., a hook) and an example lock. The disclosed adapter is receivable by the lock and coupled to a first component of the drone such as, for example, a beam (e.g., a keel-beam or tail boom). Further, the disclosed lock is positioned in or internal to a second component of the drone different from the first component such as, for example, a wing. For example, the lock can be supported by a support structure extending through a wing of the drone. In particular, the disclosed lock is configured to interact with the adapter to connect (e.g., removably connect) the first component of the drone to the second component of the drone, which will be discussed in greater detail below in connection with FIGS. 1A, 1B, and 2-12. In some examples, the lock is changeable between (a) a locked state in which the lock couples the first component to the second component and (b) and an unlocked state in which the lock decouples the first component from the second component. In such examples, to change the state of the lock, a torque is applied to a portion of the lock, for example, by the user(s).

In some examples, the disclosed lock includes a first lock portion (e.g., a cylindrical body) and a second lock portion (e.g., a cylindrical body) different from the first lock portion. The first lock portion is fixedly coupled to the second component of the drone, and the second lock portion is rotatably coupled to the first lock portion. For example, the first lock portion includes an inner space (e.g., a cavity or chamber that is cylindrically shaped) in which the second lock portion is disposed. As such, the second lock portion is rotatable relative to the first lock portion about an axis (e.g., a rotation axis), for example, between a first position (e.g., an open position) corresponding to the unlocked state of the lock and a second position (e.g., a closed position) corresponding to the locked state of the lock. In such examples, the second lock portion is configured to engage the adapter when the second lock portion is in the second position and disengage from the adapter when the second lock portion is in the first position. In particular, when in the second position, the second lock portion prevents the adapter from separating from the second component of the drone and, thus, prevents the first component of the drone from separating from the second component. On the other hand, when in the first position, a slot formed by the second lock portion allows the adapter to separate from the second lock portion. As such, the state of the disclosed lock can be changed by varying the position of the second lock portion relative to the first lock portion. For example, the lock is configured to change from the unlocked state to the locked state in response to the second lock portion rotating relative to the first lock portion (e.g., by about 180 degrees) from the first position to the second position while the adapter is positioned proximate to the second lock portion.

Additionally, in some examples, the second lock portion is substantially immobile relative to the first lock portion in the first position and/or the second position, which facilitates maintaining (e.g., temporarily) the state of the lock. That is, in such examples, the second lock portion remains in the first or second position (i.e., the lock remains in the unlocked or locked state) until a torque applied to the second lock portion is equal to or greater than a required torque. In this manner, disclosed examples ensure the first and second components of the drone do not decouple from each other during drone operation. Additionally, in some examples, the disclosed lock includes a lever, which facilitates interactions between the lock and the user(s). In such examples, the lever is coupled to the second lock portion and extends radially outward relative to an axis of the second lock portion. Further, the disclosed lever can be external to the second component of the drone while first and second lock portions are internal to the second component. As such, the disclosed lock can be easily accessible to the user(s) via the lever.

In some examples, to assemble the first and second components of the drone via the disclosed lock mechanism, the lock is first set to the unlocked state. Then, the first component of the drone is positioned relative to the second component such that the disclosed adapter on the first component is proximate to the lock or the second lock portion. For example, the adapter can move through the slot formed by the second lock portion when the second lock portion is in the first position. Finally, a certain torque (e.g., a torque that is equal to or greater than the required torque) is applied to the second lock portion to change the lock from the unlocked state to the locked state. Conversely, in some examples, to disassemble the first and second components of the drone via the disclosed lock mechanism, a certain torque is first applied to the second lock portion to change the lock from the locked state to the unlocked state. Then, the adapter is separated from the lock or the second lock portion.

In this manner, the disclosed lock mechanism enables the user(s) to quickly assemble and/or disassemble the drone or a portion thereof without a tool, which would have otherwise been unattainable using the above-mentioned drones. The adapter, the lock, and/or, more generally, the disclosed lock mechanism ensures the absence of backlash in places of connections such as, for example, between a wing and a fuselage, between a wing and a tail boom, etc. Further, disclosed examples also reduce design complexity typically associated with the above-mentioned drones, thereby reducing assembly time and/or the possibility of user error when interacting with drone components.

FIG. 1A is a view of an example drone (e.g., a UAV) 100 in which examples disclosed herein can be implemented. According to the illustrated example of FIG. 1A, the drone 100 includes a drone assembly 101 that can be assembled and/or disassembled by one or more users to form at least part of the drone 100. The drone assembly 101 includes a first wing 102, a first beam (e.g., a keel-beam), and a first lock 106. The first beam 104 of FIG. 1A is connected (e.g., removably connected) to the first wing 102 via the first lock 106, as will be discussed further below in connection with FIGS. 1B and 2-12. In particular, the first lock 106 is configured to change state in response to the user(s) interacting with a portion of the first lock 106. For example, the first lock 106 of FIG. 1A is changeable and/or configured to change between (a) a locked state in which the first lock 106 couples the first beam 104 to the first wing 102 and (b) an unlocked state in which the first lock 106 decouples the first beam 104 from the first wing 102. As shown in FIG. 1A, the drone assembly 101 is assembled, and the drone 100 is ready for operation (e.g., flight). Accordingly, the first lock 106 of FIG. 1A is in the locked state. On the other hand, when disassembled (e.g., see FIG. 6), the drone assembly 101 can be efficiently and/or compactly stored, for example, in a portable case or storage unit.

The first beam 104 of FIG. 1A can be implemented, for example, using a keel-beam, which is sometimes referred to as a boom or tail boom. The first beam 104 of FIG. 1A facilitates providing support to one or more components of the drone 100 such as, for example, a tail component 108. As shown in FIG. 1A, the first beam 104 can extend along a first axis (e.g., a roll axis of the drone assembly 101) 110 away from the first wing 102 toward the tail component 108. Further, in some examples, the first beam 104 of FIG. 1A is coupled to the tail component 108, for example, via one or more fasteners and/or one or more fastening methods or techniques.

The first lock 106 of FIG. 1A aids one or more users in assembling (e.g., manually) and/or disassembling (e.g., manually) the drone assembly 101. In some examples, the first lock 106 is configured to connect (e.g., removably connect) the first beam 104 to the first wing 102. In such examples, the first lock 106 of FIG. 1A is positioned in the first wing 102. Alternatively, in some examples, the first lock 106 is configured to similarly connect two different components of the drone 100 together. For example, the drone assembly 101 can also include a fuselage 111. In such examples, the first lock 106 can be configured to connect (e.g., removably connect) the first wing 102 to the fuselage 111.

Although FIG. 1A depicts the drone assembly 101 including the first wing 102, the first beam 104, the first lock 106, and the fuselage 111, in some examples, the drone assembly 101 of FIG. 1A is implemented differently. For example, the drone assembly 101 of FIG. 1A can include one or more additional, fewer, and/or different components of the drone 100. In some examples, the drone assembly 101 also includes a second wing 112, a second beam 114, and a second lock (e.g., similar to the first lock 106) 116 connecting (e.g., removably connecting) the second beam 114 to the second wing 112. As shown in FIG. 1A, the first beam 104 and the second beam 114, together, can be configured to support the tail component 108 when the drone assembly 101 is assembled.

FIG. 1B is a partial cross-sectional view of the first wing 102 of FIG. 1A and shows a first implementation of the first lock 106 in accordance with the teachings of this disclosure. According to the illustrated example of FIG. 1B, the drone assembly 101 includes a first adapter (e.g., a hook) 118, which can interact with the first lock 106 and/or the second lock 116. The first adapter 118 of FIG. 1B is positionable on a component of the drone assembly 101. As shown in FIG. 1B, the first adapter 118 is positioned on an end 120 of the first beam 104. In particular, the first lock 106 of FIG. 1B or a portion thereof is configured to receive the adapter 118, for example, during an assembly process.

In some examples, the first lock 106 of FIG. 1B includes a first lock portion 122 and a second lock portion 124 different relative to first lock portion 122. The first lock portion 122 of FIG. 1B is configured to couple to a component of the drone assembly 101. As shown in FIG. 1B, the first lock portion 122 is coupled to the first wing 102. Further, the second lock portion 124 is rotatable relative to the first lock portion 122 between a first position (e.g., an open position) and a second position (e.g., a closed position), which changes the state of the first lock 106. In particular, the first lock 106 is configured to (a) couple the first beam 104 to the first wing 102 when the second lock portion 124 is in the second position and (b) decouple the first beam 104 from the first wing 102 when the second lock portion 124 is in the first position. Additionally, in some examples, the second lock portion 124 is substantially immobile relative to the first lock portion 122 when the second lock portion 124 is in the first position and/or the second position, which facilitates maintaining a state of the first lock 106, as discussed further below. That is, in such examples, the second lock portion 124 remains in the first or second position until a torque 125 (sometimes referred to as an input torque) applied to the second lock portion 124 is equal to or greater than a threshold or required torque.

In some examples, to change the state of the first lock 106, the torque 125 is applied to the second lock portion 124, which causes the second lock portion 124 to rotate relative to the first lock portion 122. The torque 125 can be provided, for example, via a user interacting with the second lock portion 124. In other words, rotation of the second lock portion 124 relative to the first lock portion 122 changes the state of the first lock 106 between the locked state and the unlocked state. According to the illustrated example of FIG. 1B, the second lock portion 124 of FIG. 1B is in the second position thereof, which provides the second state of the first lock 106. Thus, the first lock 106 of FIG. 1B is in the second state and, as a result, coupling (e.g., removably couple) the first beam 104 to the first wing 102. The first position of the second lock portion 124 is generally represented by the dotted/dashed lines of FIG. 1B. When the second lock portion 124 is in the first position, the second lock portion 124 provides the first state of the first lock 106.

Each of the first and second positions of the second lock portion 124 is an angular position. For example, the second lock portion 124 can rotate relative to the first lock portion 122 about a second axis 202 (shown in FIG. 2) across an angle (e.g., substantially 180 degrees) from the first position to the second position and vice versa. As such, the first position of the second lock portion 124 is sometimes referred to as a first angular position, and the second position of the second lock portion 124 is sometimes referred to as a second angular position.

According to the illustrated example of FIG. 1B, the second lock portion 124 forms a slot 126. That is, the second lock portion 124 of FIG. 1B includes the slot 126, which is positioned on the second lock portion 124. The slot 126 facilitates disengaging the adapter 118 from the second lock portion 124 and/or, more generally, from the first lock 106. In particular, the adapter 118 is movable through the slot 126 when the second lock portion 124 is in the first position, as discussed further below in connection with FIG. 7. On the other hand, the adapter 118 is configured to engage or directly contact the second lock portion 124 when the second lock portion 124 is in the second position, thereby maintaining a position and/or an orientation of the adapter 118 relative to the first wing 102. Such engagement between the adapter 118 and the second lock portion 124 prevents the first beam 104 from separating from the first wing 102. In some examples, the adapter 118 includes a hook 128 configured to engage the second lock portion 124 when the second lock portion 124 is in the second position. Accordingly, in such examples, the hook 128 is movable through the slot 126 when the second lock portion 124 is in the first position. However, in some examples, the adapter 118 of FIG. 1B is implemented differently while still sufficiently maintaining such functionality.

In some examples, the adapter 118 and the first lock 106, together, form and/or define an example lock mechanism (e.g., a beam lock mechanism) 129 for the drone 100 in accordance with the teachings of this disclosure. Stated differently, the lock mechanism 129 of FIG. 1B includes the adapter 118 and the first lock 106. In such examples, the lock mechanism 129 is configured for use with the drone 100.

In some examples, the adapter 118 includes a recess 130 and an outer surface (e.g., a curved surface that is substantially smooth) 132 forming the recess 130. Further, the second lock portion 124 includes an outer surface (e.g., an outer circumferential surface such as a cylindrical surface) 134 that is receivable by the outer surface 132 of the adapter 118. In some examples, a shape of the outer surface 134 matches and/or conforms to a shape of the outer surface 132, which improves locking performance. In such examples, the outer surface 132 of the adapter 118 can be concave, and the outer surface 134 of the second lock portion 124 can be convex. As shown in FIG. 1B, the outer surface 132 of the adapter 118 is facing the outer surface 134 of the second lock portion 124. In particular, in such examples, the outer surface 134 of the second lock portion 124 is configured to slide against the outer surface 132 of the adapter 118 as the second lock portion 124 approaches the second position.

In some examples, the second lock portion 124 or the outer surface 134 thereof enters the recess 130 as the second lock portion 124 rotates relative to the first lock portion 122 from the first position to the second position. Additionally, in such examples, the second lock portion 124 or the outer surface 134 thereof slides against the outer surface 132 of the adapter 118 as the second lock portion 124 rotates relative to the first lock portion 122 from the first position to the second position. In particular, the outer surface 134 of the second lock portion 124 is engaged with or directly contacting the outer surface 132 of the adapter 118 when the second lock portion 124 is in the second position. Conversely, in some examples, the second lock portion 124 or the outer surface 134 thereof exits the recess 130 as the second lock portion 124 rotates relative to the first lock portion 122 from the second position to the first position. In particular, the outer surface 134 of the second lock portion 124 is separated from the outer surface 132 of the adapter 118 when the second lock portion 124 is in the first position. Thus, in such examples, the second lock portion 124 is configured to engage the adapter 118 and disengage from the adapter 118 based on a position of the second lock portion 124 relative to the first lock portion 122.

According to the illustrated example of FIG. 1B, the adapter 118 is coupled to the end 120 of the first beam 104, for example, via one or more fasteners and/or one or more fastening methods or techniques. In some examples, the adapter 118 includes a surface (e.g., an inner surface) that is threaded, which is sometimes referred to as a first threaded surface. Further, in such examples, the first beam 104 includes a surface (e.g., an outer surface) that is similarly threaded, which is sometimes referred to as a second threaded surface. In particular, the first threaded surface of the adapter 118 is configured to engage the second threaded surface of the first beam 104, thereby coupling the adapter 118 to the first beam 104. However, in some examples, the adapter 118 can be coupled to the end 120 of the first beam 104 in a different manner. Further, although FIG. 1B depicts the adapter 118 and the first beam 104 being coupled together, in some examples, the adapter 118 is similarly coupled to a different component of the drone 100.

Figure 2:
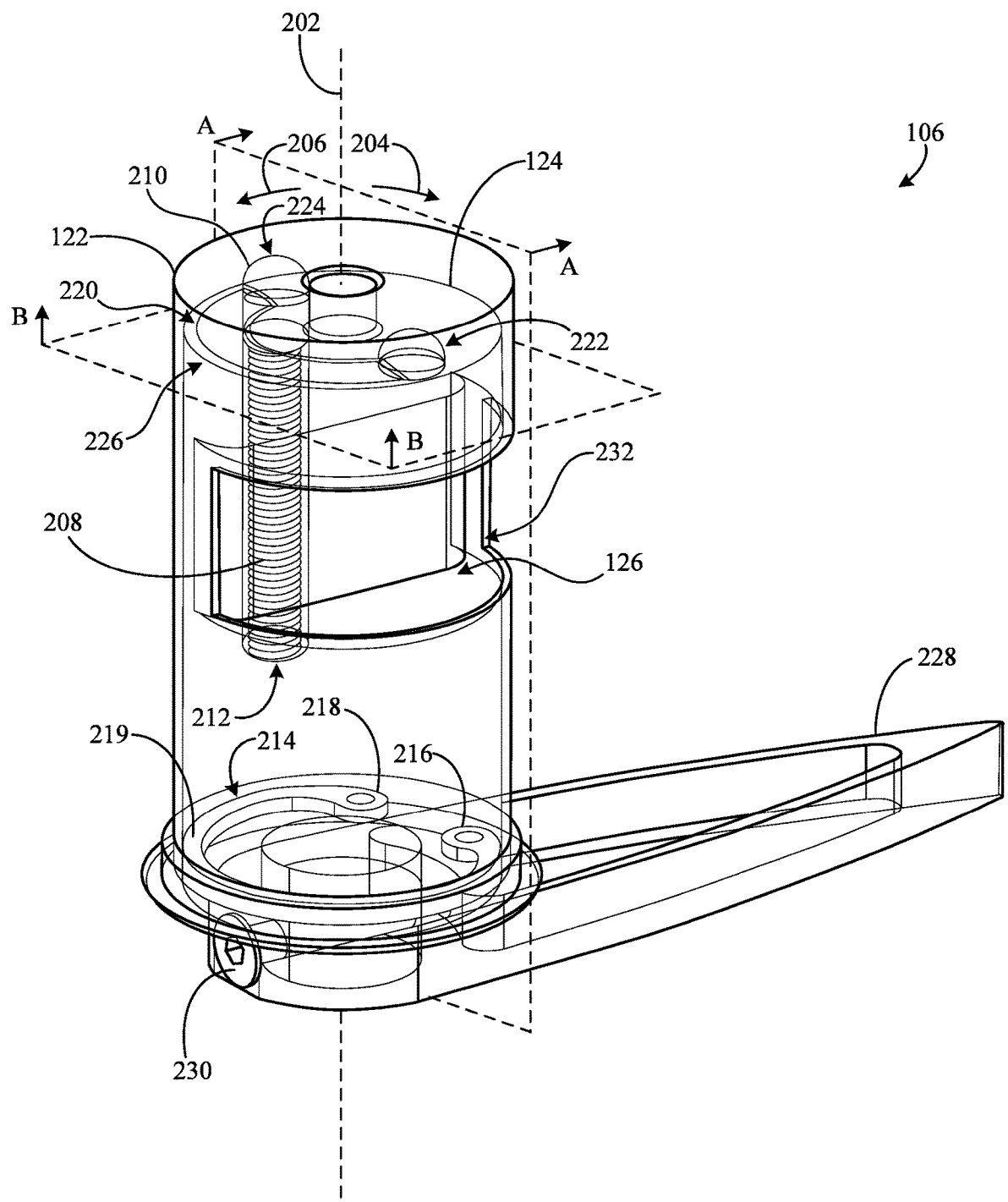
FIG. 2 is a wire-frame representation of the example lock and shows another implementation thereof in accordance with the teachings of this disclosure.

FIG. 2 is a wire-frame representation of the first lock 106 of FIG. 1A and shows a second implementation of the first lock 106 in accordance with the teachings of this disclosure. The first lock 106 of FIG. 2 includes the first lock portion 122 and the second lock portion 124. According to the illustrated example of FIG. 2, the second lock portion 124 is disposed in the first lock portion 122. In particular, the second lock portion 124 of FIG. 2 is rotatably coupled to the first lock portion 122. For example, the second lock portion 124 can rotate relative to the first lock portion 122 about a second axis 202 in a first rotational direction (e.g., clockwise) 204 and/or a second rotational direction (e.g., counterclockwise) 206 opposite the first rotational direction 204. The second axis 202 of FIG. 2 is, for example, a rotation axis of the second lock portion 124. During such relative movement of the second lock portion 124, an axial position of the second lock portion 124 relative to the first lock portion 122 is substantially maintained such that the second lock portion 124 does not separate from the first lock portion 124, as discussed further below. To turn or rotate the second lock portion 124 in such a manner, the second lock portion 124 of FIG. 2 is configured to receive the input torque 125, as previously described.

Each portion 122, 124 of the first lock 106 of FIG. 2 can be implemented, for example, using a cylindrical body. However, in some examples, one or both portions 122, 124 of the first lock 106 can be shaped differently while sufficiently maintaining such functionality. Further, each portion 122, 124 of the first lock 106 can be constructed of one or more materials having suitable properties such as, for example, any of fiberglass, metal, plastic, etc., or a combination thereof.

According to the illustrated example of FIG. 2, the first lock 106 also includes a spring (e.g., a compression spring) 208 and a clamp 210, which facilitate maintaining (e.g., temporarily) an angular position of the second lock portion 124 relative to the first lock portion 122. The spring 208 and the clamp 210, together, are interposed between the first lock portion 122 and the second lock portion 124. Further, the clamp 210 of FIG. 2 is interposed between the spring 208 and the first lock portion 122. The clamp 210 can be implemented, for example, using a cylindrical body having an end that is round or spherical. In particular, the spring 208 of FIG. 2 is urging the clamp 210 into engagement with the first lock portion 122 to resist rotational displacement of the second lock portion 124 relative to the first lock portion 124 about the second axis 202. As such, the spring 208 of FIG. 2 is at least partially compressed such that the spring 208 applies a biasing force to the clamp 210.

Additionally, in some examples, to facilitate holding and/or carrying the spring 208 and the clamp 210, the second lock portion 124 of FIG. 2 includes a first inner space (e.g., a cavity or chamber) 212. The first inner space 212 of FIG. 2 extends at least partially through the second lock portion 124 along a third axis 324 (shown in FIG. 3). In such examples, the first inner space 212 includes, for example, a cavity such as a spring cavity. For example, the first inner space 212 can be substantially cylindrical. In particular, the first inner space 212 of FIG. 2 is sized and/or shaped to receive the spring 208 and at least part of the clamp 210. That is, the spring 208 and the clamp 210 can be disposed in the first inner space 212.

In some examples, the first lock 106 includes a locking member (e.g., locking ring) 214, which facilitates rotatably coupling the second lock portion 124 to the first lock portion 122. The locking member 214 is operatively coupled between the first lock portion 122 and the second lock portion 124. In particular, the locking member 214 is configured to engage (e.g., slidably engage) the first and second lock portions 122, 124 to resist axial displacement of the second lock portion 124 relative to the first lock portion 122, as discussed further below in connection with FIG. 4. The locking member 214 can be implemented, for example, using an annular body such as a ring. As shown in FIG. 2, the locking member 214 is C-shaped. As such, the locking member 214 of FIG. 2 has a first end 216, a second end 218 adjacent the first end 216, and an intermediate portion 219 that is between the first and second ends 216, 218 of the locking member 214. That is, the first end 216 of the locking member 214 is opposite relative to the second end 218. In some examples, at least one of the first or second end 216, 218 (e.g., both the first and second ends 216, 218) can a have thickness that is greater than a thickness of the intermediate portion 219 of the locking member 214.

In some examples, the first lock 106 includes a guide groove (e.g., an annular groove) 220 positioned on the first lock portion 122, which facilitates controlling a trajectory of the clamp 210 during operation of the first lock 106. That is, the first lock portion 122 of FIG. 2 forms the guide groove 220. The guide groove 220 of FIG. 2 has a first end 222, a second end 224, and an intermediate portion 226 that is positioned between the first and second ends 222, 224 of the guide groove 220. In particular, the guide groove 220 is configured to guide movement the clamp 210. For example, the clamp 210 is configured to slide through the guide groove 220 between the first end 222 of the guide groove 220 and the second end 224 of the guide groove 220 as the second lock portion 124 moves between the first position and the second position. In such examples, the spring 208 of FIG. 2 causes the clamp 210 to remain in a portion of the guide groove 220 when the first lock 106 is assembled.

Additionally, in some examples, the first lock 106 also includes a lever 228, which facilitates interactions between the first lock 106 and a user. The lever 228 of FIG. 2 is coupled to the second lock portion 124, for example, via one or more fasteners 230 (e.g., any of a bolt, a screw, etc.) and/or one or more fastening methods or techniques. As shown in FIG. 2, the fastener 230 extends through the lever 228 and part of the second lock portion 124, thereby coupling the lever 228 to the second lock portion 124. Further, the lever 228 of FIG. 2 is extending radially outward relative to the second axis 202, which facilitates generating torque. In particular, actuation of the lever 228 changes the position of the second lock portion 124 and, consequently, the state of the first lock 106. For example, the lever 228 generates the input torque 125 when a force is applied to the lever 228. In such examples, when the first lock 106 is implemented in the drone assembly 101, the first and second locking portions 122, 124 can be internal to the first wing 102 and the lever 228 can be external to the first wing 102 (e.g., see FIGS. 7 and 8).

Additionally, in some examples, the first lock portion 122 includes a cutout 232, which facilitates positioning the adapter 118 proximate to the second lock portion 124. The cutout 232 extends through an outer surface of the first lock portion 122 to expose a second inner space 302 (shown in FIG. 3) of the first lock portion 122. As shown in FIG. 2, the cutout 232 extends partially around first lock portion 122 about the second axis 202. In particular, in such examples, the cutout 232 of FIG. 2 is configured to be adjacent and/or aligned to the slot 126 when the second lock portion 124 is in the first position. As such, the cutout 232 of FIG. 2 is sized and/or shaped to receive the adapter 118 when the second lock portion 124 is in the first position. For example, the adapter 118 can pass through the cutout 232.

Figure 3:
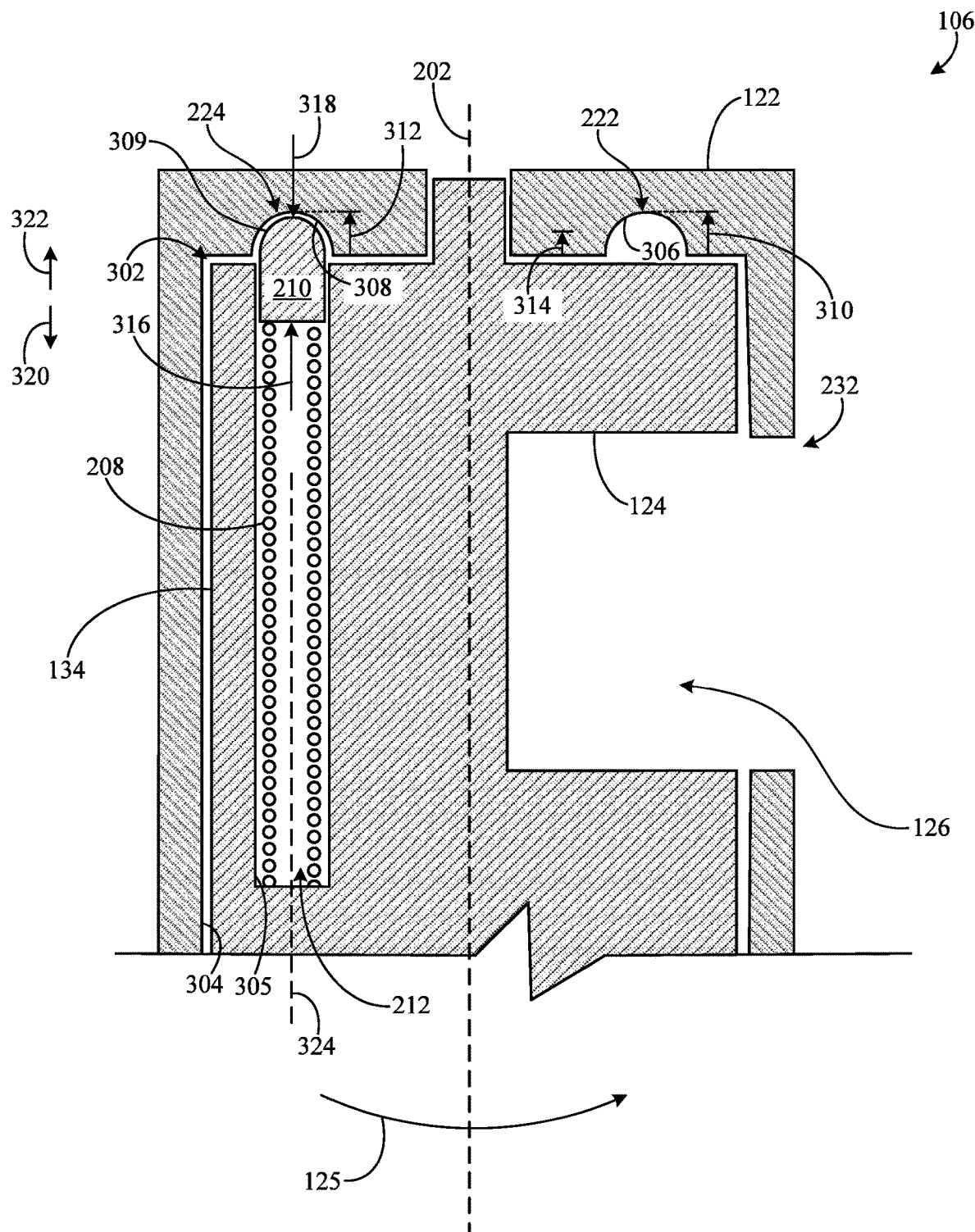
FIG. 3 is a cross-sectional view of the example lock along plane A-A of FIG. 2 and shows another implementation thereof in accordance with the teachings of this disclosure.

FIG. 3 is a cross-sectional view of the first lock 106 along plane A-A of FIG. 2 and shows another implementation thereof in accordance with the teachings of this disclosure. According to the illustrated example of FIG. 3, the first lock portion 122 includes the second inner space (e.g., a cavity or chamber) 302 in which the second lock portion 124 is positioned. For example, a first inner surface (e.g., a circumferential surface) 304 of the first lock portion 122 at least partially forms the second inner space 302. In some examples, the second inner space 302 is substantially cylindrical. As shown in FIG. 2, the second inner space 302 can extend at least partially through the first lock portion 122 along the second axis 202. As such, in some examples, the first lock portion 122 is sized, shaped, structured, and/or otherwise configured to receive the second lock portion 124 in the second inner space 302. Additionally, as shown in FIG. 3, a first inner surface (e.g., a circumferential surface) 305 of the second lock portion 124 at least partially forms the first inner space 212.

According to the illustrated example of FIG. 3, each of the first and second ends 222, 224 of the guide groove 220 is concave. As shown in FIG. 3, the first lock portion 122 can include a second inner surface (e.g., a curved surface that is substantially smooth) 306 forming the first end 222 of the guide groove 220. Similarly, the first lock portion 122 of FIG. 3 can also include a third inner surface (e.g., a curved surface that is substantially smooth) 308 forming the second end 224 of the guide groove 220. On the other hand, the clamp 210 of FIG. 3 is convex. In particular, the spring 208 of FIG. 3 is urging the clamp 210 into the second end 224 of the guide groove 220 such that an outer surface (e.g., a curved or spherical surface that is substantially smooth) 309 of the clamp 210 is engaged with the third inner surface 308 of the first lock portion 122. More particularly, the biasing force that the spring 208 applies to the clamp 210 can keep the clamp 210 in the second end 224 (or the first end 222) of the guide groove 220 until a certain torque is applied to the second lock portion 124, as discussed further below. The outer surface 309 of the clamp 210 is positioned at an end of the clamp 210 and can at least partially define the end of the clamp 210.

In some examples, the clamp 210 is configured to be positioned in the first end 222 of the guide groove 220 when the second lock portion 124 is in the first position. On the other hand, in such examples, the clamp 210 is configured to be positioned in the second end 224 of the guide groove 220 when the second lock portion 124 is in the second position. Accordingly, in such examples, the clamp 210 is configured to be positioned in the intermediate portion 226 of the guide groove 220 when the second lock portion 124 is between the first and second positions. As shown in FIG. 3, the clamp 210 is positioned in the second end 224 of the guide groove 220. Thus, the second lock portion 124 of FIG. 3 is in the second position.

In some examples, when the second lock portion 124 is in the first or second position, the clamp 210 is positioned in both the first inner space 212 and one of the first or second ends 222, 224 of the guide groove 220. In particular, the clamp 210 is configured to be engaged between the first and second lock portions 122, 124 when the clamp 210 is positioned in the first or second end 222, 224 of the guide groove 220, which substantially prevents rotation of the second lock portion 124 relative to the first lock portion 122. According to the illustrated example of FIG. 3, the clamp 210 is engaged between (a) the third inner surface 308 of the first lock portion 122 forming the second end 224 of the guide groove 220 and (b) the first inner surface 305 of the second locking portion 124 forming the first inner space 212. On the other hand, when the second lock portion 124 is in the first position, the clamp 210 is configured to be engaged between (a) the second inner surface 306 of the first lock portion 122 forming the first end 222 of the guide groove 220 and (b) the first inner surface 305 of the second locking portion 124 forming the first inner space 212.

As shown in FIG. 3, the first end 222 of the guide groove 220 extends into the first lock portion 122. As a result, the first end 222 of the guide groove 220 has a first depth 310. Similarly, the second end 224 of the guide groove 220 has a second depth 312. The first and second depths 310, 312 of FIG. 3 can be substantially equal or the same relative to the each other. Further, the intermediate portion 226 of the guide groove 220 has a third depth 314, as shown in FIG. 3. The third depth 314 can be substantially uniform across a length of the intermediate portion 226 of the guide groove 220. In some examples, each of the first depth 310 and the second depth 312 of FIG. 3 is greater than the third depth 314 of the intermediate portion 226. Stated differently, in such examples, the first and second ends 222, 224 of the guide groove 220 extend deeper into the first lock portion 122 relative to the intermediate portion 226 of the guide groove 220. In this manner, the guide groove 220 enables the second lock portion 124 to lock (e.g., temporarily) relative to the first lock portion 122 when the second lock portion 124 is in the first position and/or the second position.

In some examples, the clamp 210 of FIG. 3 is configured to exit the first or second end 222, 224 of the guide groove 220 when the torque 125 applied to the second lock portion 124 is equal to or greater than the required torque. The torque 125 can be generated and applied to the second lock portion 124, for example, by a user interacting with the lever 228, as previously described. The required torque is based at least partially on parameters associated with the spring 208 and the guide groove 220. For example, the required torque is based on any of (a) a stiffness of the spring 208, (b) the first depth 310, (c) the second depth 312, (d) the third depth 314, (e) a shape of the second inner surface 306 of the first lock portion 122, (f) a shape of the third inner surface 308 of the first lock portion 122, (g) a shape of the outer surface 309 of the clamp 210, (h) etc., (i) any other suitable parameters associated with the first lock 106, or (j) a combination thereof. As such, any one or more (e.g., all) of the above parameter(s) can be adjusted and/or configured to provide a certain required torque for changing the state of the first lock 106. In particular, in such examples, if the torque 125 applied to the second lock portion 124 is below the required torque, the clamp 210 remains in the first or second end 222, 224 of the guide groove 220. That is, the state of the first lock 106 and/or the position of the second lock portion 124 change only when the input torque 125 is above the required torque.

The spring 208 of FIG. 3 can be implemented, for example, using a compression spring (e.g., a coil spring) and/or any other suitable spring member. In particular, the spring 208, when at least partially compressed, is configured to generate a first force (e.g., a biasing force) 316 and apply the first force 316 to the clamp 210, which urges the clamp 210 toward the first lock portion 122 and/or away from the second lock portion 124. Further, to counteract the first force 316, the first lock portion 122 or an inner surface 306, 308 thereof is configured to apply a second force 318 to the clamp 210 opposite relative to the first force 316.

In some examples, the first force 316 of FIG. 3 is equal or the same relative to the second force 318 while (a) the clamp 210 is in the first or second end 222, 224 of the guide groove 220 and (b) the input torque 125 is below the required torque. On the other hand, when the input torque 125 is above the required torque, the second force 318 increases relative to the first force 316 as the second lock portion 124 begins to move away from an initial position (e.g., the first or second position of the second lock portion 124). As a result, the clamp 210 of FIG. 3 moves through the first inner space 212 in a first direction (e.g., a vertical direction) 320 in response to the first force 316 being greater than the second force 318. In such examples, rotation of the second lock portion 124 of FIG. 3 relative to the first lock portion 122 causes the second or third inner surface 306, 308 to slide against the outer surface 309 of the clamp 210, thereby urging the clamp 210 out of the first or second end 222, 224 and deeper into the first inner space 212. In such examples, a distance traveled by the clamp 210 in the first direction 320 corresponds to a difference between the third depth 314 and the first or second depth 310, 312. Such movement of the clamp 210 in the first direction 320 allows the clamp 210 to pass into the intermediate portion 226 of the guide groove 220.

Additionally, in some examples, the first force 316 of FIG. 3 is equal or the same relative to the second force 318 while the clamp 210 is in the intermediate portion 226 of the guide groove 220. In such examples, the second lock portion 124 can rotate relative to the first lock portion 122 while the input torque 125 is below the required torque until the clamp 210 reaches the first or second end 222, 224 of the guide groove 220. In particular, the second force 318 decreases relative to the first force 316 as the clamp 210 exits the intermediate portion 226 of the guide groove 220 and enters the first or second end 222, 224 of the guide groove 220. As a result, the clamp 210 moves through the first inner space 212 in a second direction 322, opposite the first direction 320, in response to the first force 316 being less than the second force 318. Accordingly, the clamp 210 of FIG. 3 is movable through the first inner space 212 in the first direction 320 and/or the second direction 322, depending on the first and second forces 316, 318.

According to the illustrated example of FIG. 3, the first inner space 212 extends along a third axis (e.g., a longitudinal axis of the first inner space) 324. As shown in FIG. 3, the third axis 324 can be parallel and/or offset relative to the second axis 202. Additionally, the slot 126 of FIG. 3 extends transversely through the second lock portion 124. That is, the slot 126 extends through the second lock portion 124 in a direction that is perpendicular relative to the second axis 202. Similarly, the cutout 232 of FIG. 3 extends transversely through the first lock portion 122.

In some examples, the slot 126 aligns to the cutout 232 when the second lock portion 124 is in the first position, as shown in FIG. 3. In such examples, the slot 126 and the cutout 232 substantially form a single opening in the first lock 106 through which the adapter 118 can move. Additionally, in some examples, the outer surface 134 of the second lock portion 124 faces the first inner surface 304 of the first lock portion 122 when the second lock portion 124 is in the first position, as shown in FIG. 3.

Figure 4:
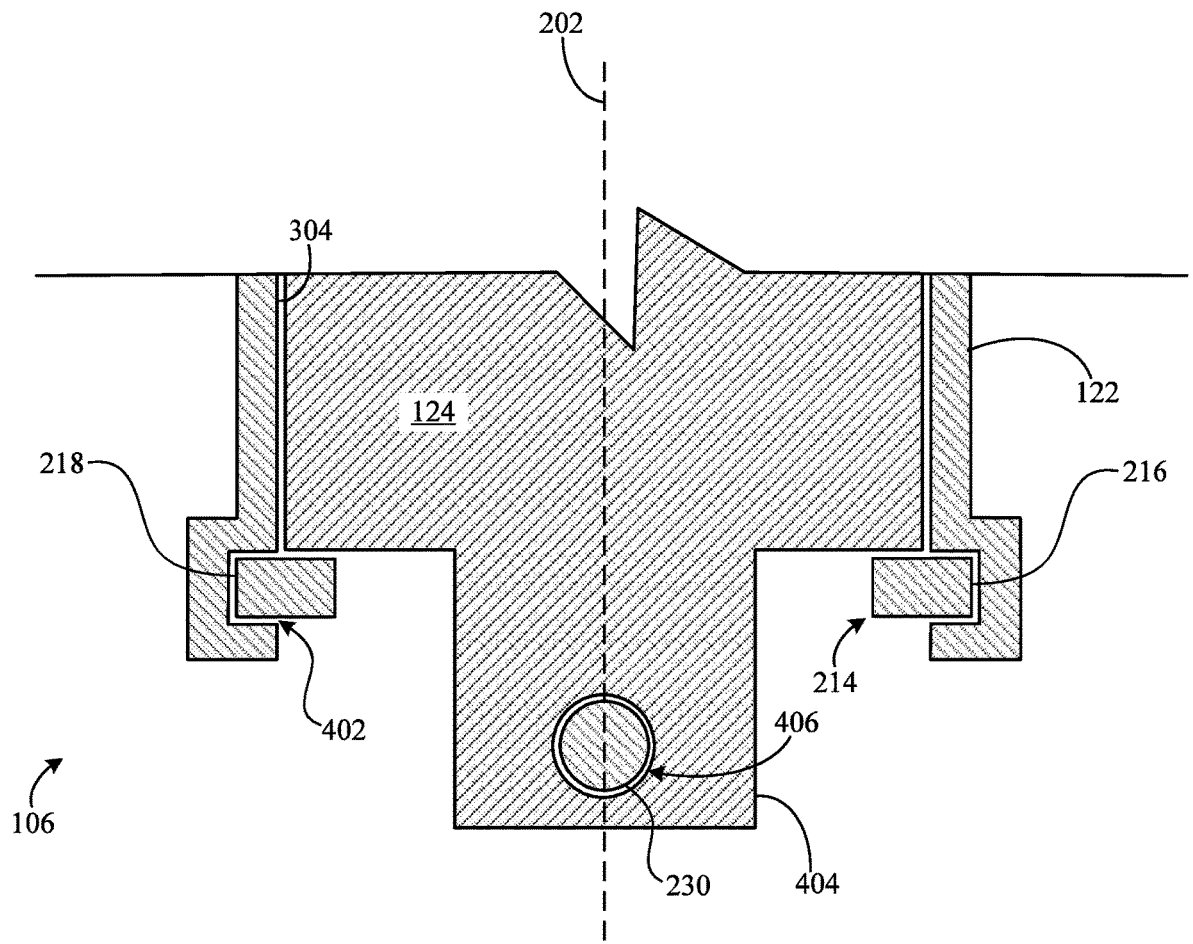
FIG. 4 is another cross-sectional view of the example lock along plane A-A of FIG. 2 and shows another implementation thereof in accordance with the teachings of this disclosure.

FIG. 4 is another cross-sectional view of the first lock 106 along plane A-A of FIG. 2 and shows another implementation thereof in accordance with the teachings of this disclosure. According to the illustrated example of FIG. 4, the first lock portion 122 includes an auxiliary groove (e.g., a circumferential groove) 402, which facilitates carrying and/or holding the locking member 214. The auxiliary groove 402 of FIG. 4 is an inner groove. For example, the first inner surface 304 of the first lock portion 122 forms the auxiliary groove 402. In some examples, the auxiliary groove 402 surrounds the second lock portion 124 or at least a portion thereof. In particular, the auxiliary groove 402 of FIG. 4 is sized and/or shaped to receive the locking member 214. For example, the locking member 214 of FIG. 4 can extend through the auxiliary groove 402.

The locking member 214 of FIG. 4 or at least a portion thereof is positioned between the first lock portion 122 and the second lock portion 124. As shown in FIG. 4, the first end 216 of the locking member 214 can extend out of the auxiliary groove 402 radially inward relative to the second axis 202 such that the first end 216 partially overlaps with the second lock portion 124. For example, the first end 216 of the locking member 214 extends alongside both the first lock portion 122 and the second lock portion 124. Similarly, as shown in FIG. 4, the second end 218 of the locking member 214 can extend out of the auxiliary groove 402 radially inward relative to the second axis 202 such that the second end 218 partially overlaps with the second lock portion 124.

Additionally, in some examples, the second lock portion 124 includes a protrusion 404, which facilitates connecting the lever 228 to the second lock portion 124. The protrusion 404 is coupled to the second lock portion 124, for example, via one or more fasteners and/or one or more fastening methods or techniques. In some examples, the protrusion 404 of FIG. 4 is configured to receive at least one fastener for coupling the lever 228 to the second lock portion 124. As shown in FIG. 4, the fastener 230 is positioned in an opening (e.g., circular opening) 406 that extends through the protrusion 404.

Figure 5:
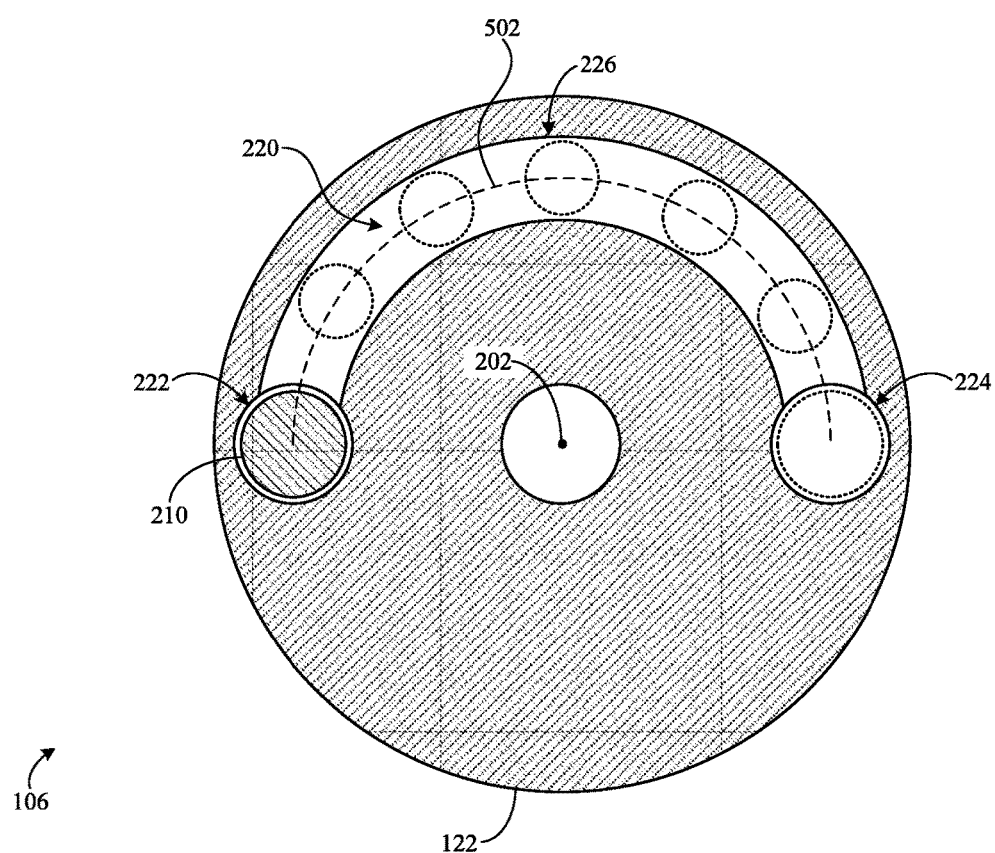
FIG. 5 is a cross-sectional view of the example lock along plane B-B of FIG. 2 and shows another implementation thereof in accordance with the teachings of this disclosure.

FIG. 5 is a cross-sectional view of the first lock 106 along plane B-B of FIG. 2 and shows another implementation thereof in accordance with the teachings of this disclosure. According to the illustrated example of FIG. 5, the clamp 210 is positioned in the second end 222 of the guide groove 220 and engaged with the first portion 122 of the first lock 106. In particular, the clamp 210 of FIG. 5 is slidable through intermediate portion 226 of the guide groove 220 from the second end 224 of the guide groove 220 to the first end 222 and vice versa, as generally represented by the dotted/dashed lines of FIG. 5. In some examples, the clamp 210 travels along a path (e.g., a curved path) 502 defined by the guide groove 220. As shown in FIG. 5, the path 502 can be arc-shaped and extend around the second axis 202 substantially at a radius.

Figure 6:
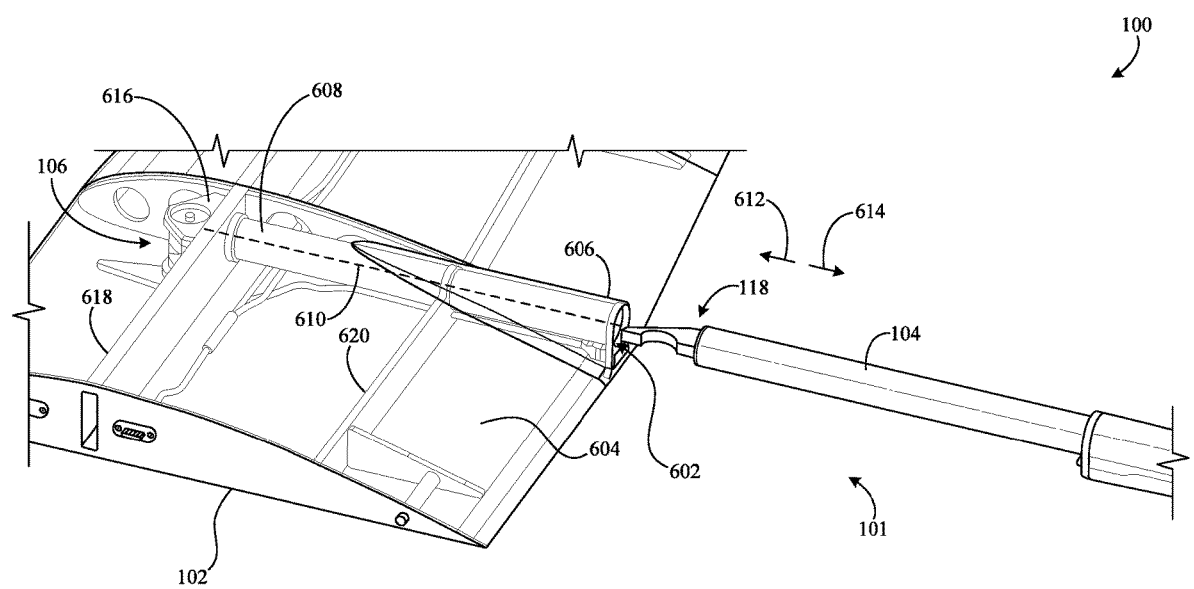
FIGS. 6-8 are enlarged portion views of the example drone of FIG. 1A.

FIG. 6 is an enlarged portion view of the drone 100 of FIG. 1A. According to the illustrated example of FIG. 6, the drone assembly 101 is partially disassembled. As shown in FIG. 6, the first beam 104 is separated and/or spaced from the first wing 102. In some examples, the first wing 102 or a portion thereof forms a primary opening (e.g., a circular opening) 602, which allows the first beam 104 and the adapter 118 to pass into the first wing 102. For example, the first wing 102 includes an upper wing surface 604 and a portion 606 coupled to the upper wing surface 604. As shown in FIG. 6, the portion 606 of the first wing 102 projects or extends away from the upper wing surface 604. In particular, in such examples, the primary opening 602 is positioned on the portion 606 of the first wing 102. In any case, the primary opening 602 of FIG. 6 is sized and/or shaped to receive the adapter 118 and the first beam 104. As such, the adapter 118 and the first beam 104 can be inserted in the primary opening 602.

Additionally, in some examples, the drone assembly 101 also includes a guide tube 608, which facilitates moving the adapter 118 from the primary opening 602 to the first lock 106. The guide tube 608 of FIG. 6 can be implemented, for example, using a tubular body (e.g., a cylindrical tube). In such examples, the guide tube 608 is coupled to the first wing 102, for example, via one or more fasteners and/or one or more fastening methods or techniques. Further, the guide tube 608 is interposed between the first lock 106 and the primary opening 602 formed by the first wing 102. In particular, in such examples, the guide tube 608 is configured to guide the first beam 104 as the adapter 118 moves through the guide tube 608 from the primary opening 602 to the first lock 106. In some examples, while the guide tube 608 is providing such guidance, the first beam 104 is axially movable along a fourth axis 610 in a third direction 612 and/or a fourth direction opposite 614 the third direction 612. The fourth axis 610 of FIG. 6 is, for example, a longitudinal axis of the guide tube 608. For example, an inner surface (e.g., a circumferential surface) of the guide tube 608 is configured to engage (e.g., slidably engage) an outer surface (e.g., a circumferential surface) of the first beam 104, thereby providing guidance to the first beam 104.

In this manner, the guide tube 608 of FIG. 6 substantially maintains an orientation of the first beam 104 relative to the first wing 102 during assembly.

According to the illustrated example of FIG. 6, the first lock 106 is disposed in the first wing 102. In some examples, first lock 106 includes a bracket 616, which facilitates connecting the first lock 106 or the first portion 122 thereof to the first wing 102. For example, the first lock 106 of FIG. 6 or the first portion thereof 122 is coupled to part of the first wing 102 via the bracket 616. Further, in such examples, the first wing 102 includes a first support structure 618 on which the bracket 616 and/or the guide tube 608 can be supported. The bracket 616 of FIG. 6 is positioned on the first support structure 618 and coupled thereto, for example, via one or more fasteners and/or one or more fastening methods or techniques (e.g., welding). In particular, the bracket 616 is coupled between the first lock portion 122 and the first support structure 618 of the first wing 102, thereby providing support to the first lock 106. As shown in FIG. 6, the first support structure 618 can extend through the first wing 102.

Additionally, in some examples, the first wing 102 also includes a second support structure 620 spaced from the first support structure 618. As shown in FIG. 6, the first and second support structures 618, 620 extend through the first wing 102 substantially parallel to each other. In such examples, the first and second support structures 618, 620, together, are configured to provide support to the guide tube 608. The guide tube 608 of FIG. 6 can be coupled to the first support structure 618 and/or the second support structure 620, for example, via one or more fasteners and/or more fastening methods or techniques.

Figure 7:
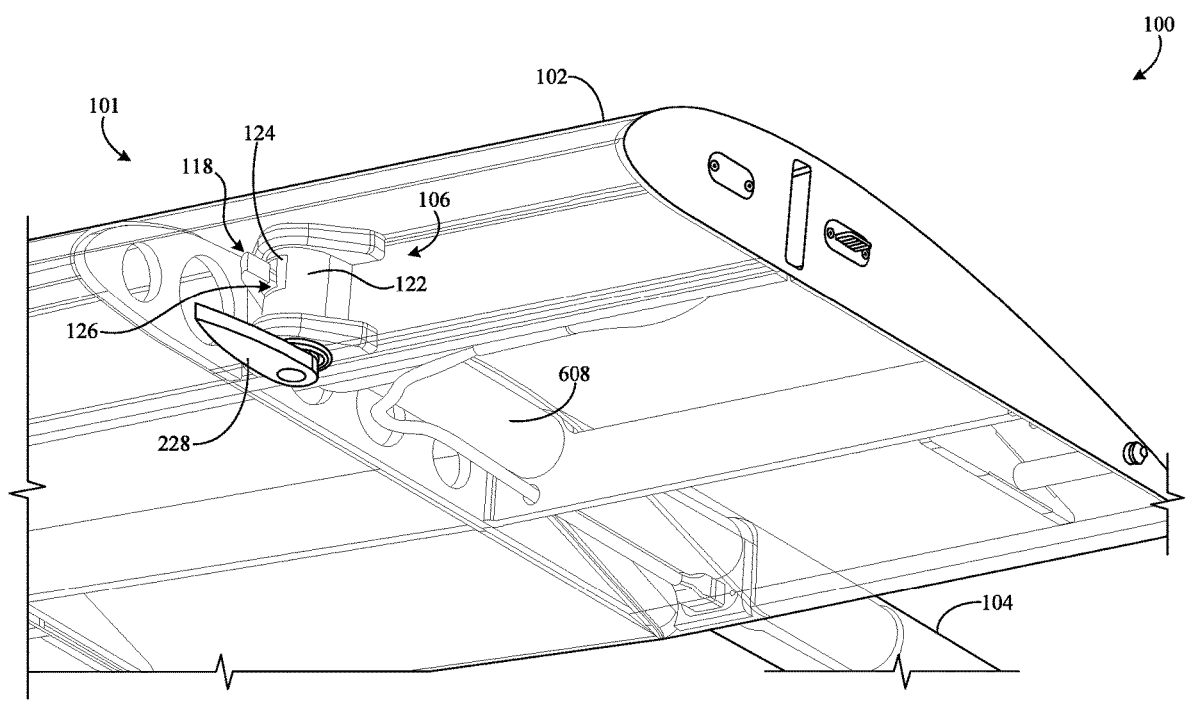

FIG. 7 is another enlarged portion view of the drone 100 of FIG. 1A. According to the illustrated example of FIG. 7, the drone assembly 101 is partially assembled. As shown in FIG. 7, the first beam 104 is inserted in the guide tube 608. That is, the first beam 104 of FIG. 7 is extending through the first wing 102 via the guide tube 608 from the primary opening 602 to the first lock 106. Further, the first lock 106 of FIG. 7 is in the unlocked state (i.e., the second lock portion 124 is in the first position). In particular, the adapter 118 of FIG. 7 is movable through the slot 126 of the second lock portion 124. As shown in FIG. 7, the adapter 118 is adjacent or proximate to the second lock portion 124, for example, such that the outer surface 132 of the adapter 118 faces the slot 126. Such relative positioning of the adapter 118 allows the outer surface 134 of the second lock portion 124 to engage the outer surface 132 of the adapter 118 when the second lock portion 124 is turned or otherwise changes position.

In some examples, part of the first lock 106 is positioned in the first wing 102 while part of the first lock 106 is positioned out of the first wing 102, which aids a user in accessing the first lock 106. For example, as shown in FIG. 7, the first and second lock portions 122, 124 can be internal to the first wing 102, and the lever 228 can be external to the first wing 102.

Figure 8:
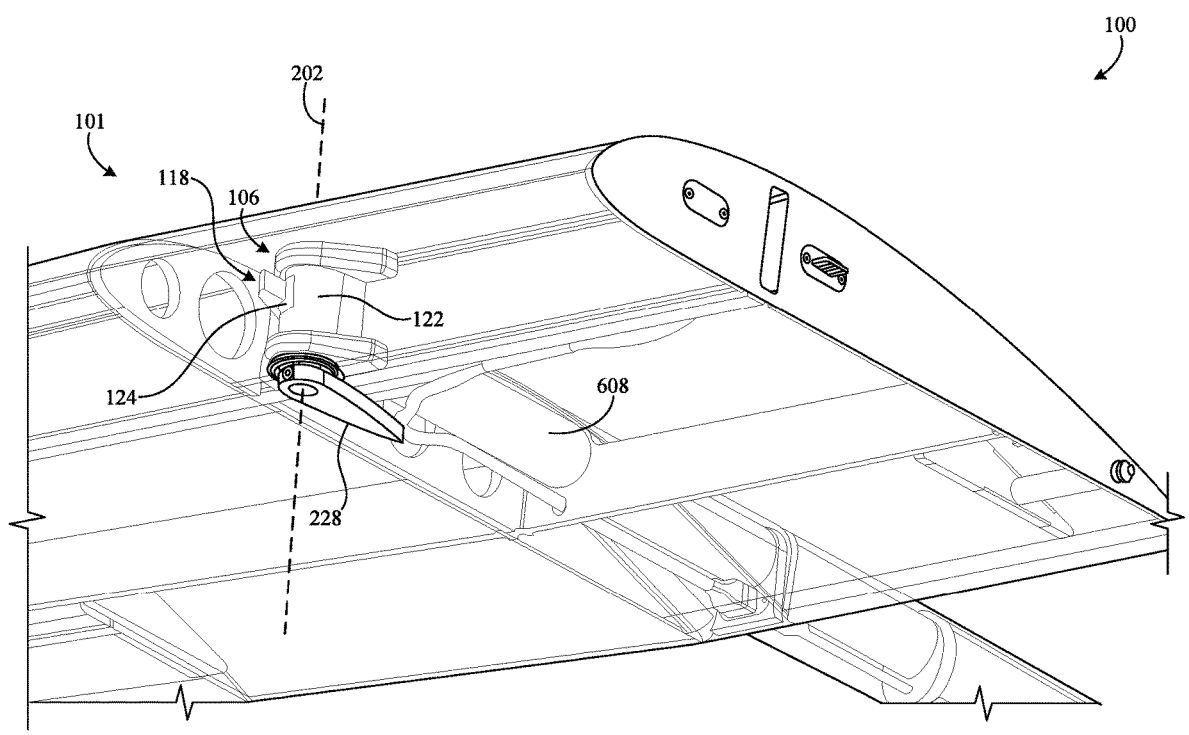

FIG. 8 is another enlarged portion view of the drone 100 of FIG. 1A. According to the illustrated example of FIG. 8, the drone assembly 101 is fully assembled. In contrast to the illustrated example of FIG. 7, the lever 228 of FIG. 8 has rotated relative to the second axis 202 (e.g., by about 180 degrees) to change the position of the second lock portion 124. The first lock 106 of FIG. 8 is in the locked state (i.e., the second lock portion 124 is in the second position). In particular, the second lock portion 124 is positioned in the recess 130 of the adapter 118. As a result, the outer surface 132 of the adapter 118 and the outer surface 134 of the second lock portion 124 are engaged with or directly contacting each other (e.g., see FIG. 1B). In this manner, the first lock 106 and the adapter 118, together, prevent the first beam 104 from moving along the axis 610 of the guide tube 608 in the third direction 612 or the fourth direction 614. As shown in FIG. 8, the lever 228 can be positioned and/or oriented substantially parallel relative to the first axis 110 when the first lock 106 is in the locked state, which reduces drag on the drone 100 during flight.

Figure 9:
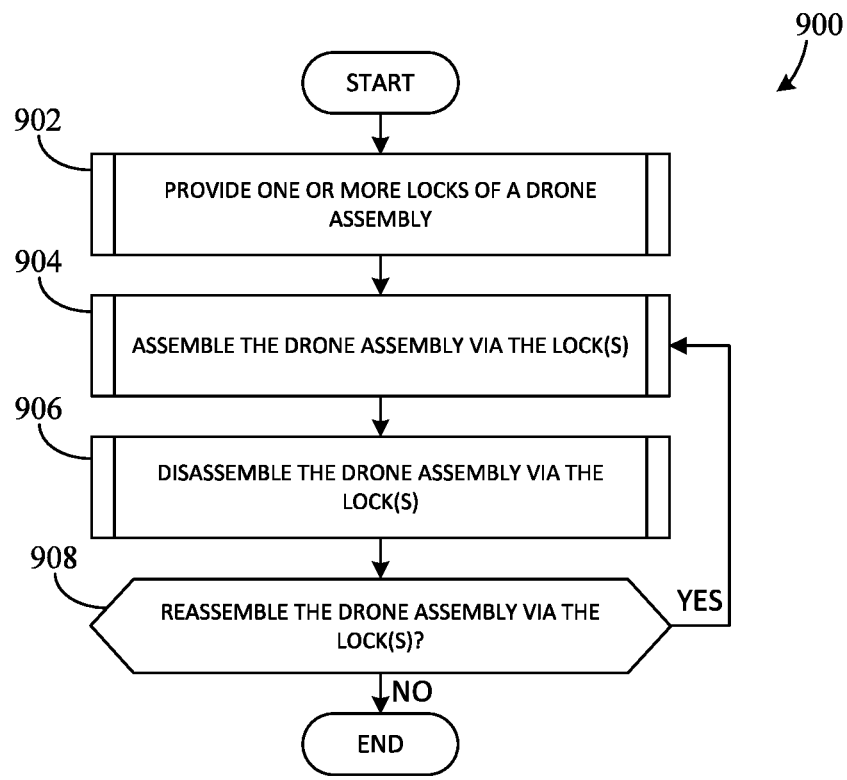
FIGS. 9-12 are flowcharts representative of example methods that can be executed to implement one or more examples disclosed herein.

FIG. 9 is a flowchart representative of an example method 900 that can be executed to implement one or more examples disclosed herein. The example method 900 of FIG. 9 can be implemented in any of the example drone 100 of FIGS. 1A and 6-8 and/or the example drone assembly 101 of FIGS. 1A, 1B, and 6-8.

The example method 900 of FIG. 9 begins by providing one or more locks of a drone assembly (block 902). In some examples, the first lock 106 of FIGS. 1A, 1B, and 2-8 is provided, for example, via one or more manufacturing processes. Additionally or alternatively, in some examples, the second lock 116 of FIG. 1A is similarly provided.

The example method 900 of FIG. 9 also includes assembling the drone assembly via the lock(s) (block 904). In some examples, the drone assembly 101 of FIGS. 1A, 1B, and 6-8 is assembled via the first lock 106 and/or the second lock 116. In particular, the drone assembly 101, when assembled, forms the drone 100 or at least a portion thereof.

The example method 900 of FIG. 9 also includes disassembling the drone assembly via the lock(s) (block 906). In some examples, the drone assembly 101 of FIGS. 1A, 1B, and 6-8 is disassembled via the first lock 106 and/or the second lock 116, which allows for storing and/or transporting the drone assembly 101 when the drone assembly 101 is not in use.

The example method also includes determining whether to reassemble the drone assembly (block 908). In some examples, if reassembly of the drone assembly 101 of FIGS. 1A, 1B, and 6-8 is desired (block 908: YES), control of the example method 900 of FIG. 9 returns to block 904. On the other hand, in some examples, if reassembly of the drone assembly 101 is not desired (block 908: NO), the example method 900 of FIG. 9 ends.

Although the example method 900 is described in connection with the flowchart of FIG. 9, other methods of implementing the example drone 100 and/or the example drone assembly 101 may be alternatively used. For example, the order of execution of the blocks 902, 904, 906, 908 may be changed, and/or some of the blocks 902, 904, 906, 908 described may be changed, eliminated, or combined.

Figure 10:
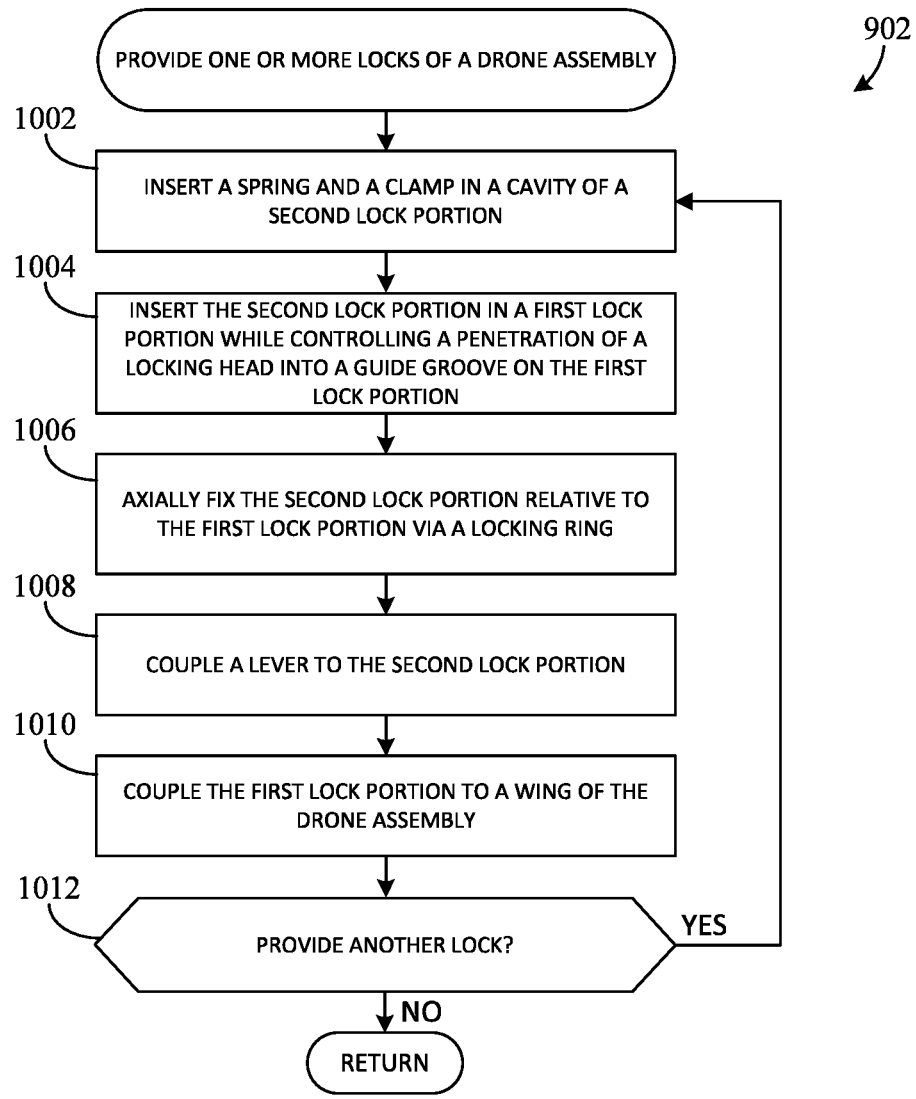

FIG. 10 is another flowchart representative of another example method 902 that can be executed to implement one or more examples disclosed herein. The example method 902 of FIG. 10 can be implemented in any of the example drone 100 of FIGS. 1A and 6-8 and/or the example drone assembly 101 of FIGS. 1A, 1B, and 6-8. Example operations of blocks 1002, 1004, 1006, 1008, 1010, 1012 may be used to implement block 902 of FIG. 9. In particular, the example method 902 of FIG. 10 is effective in providing one or more locks of a drone assembly in accordance with the teachings of this disclosure.

The example method 902 of FIG. 10 begins by inserting a spring and a clamp in a cavity of a second lock portion (block 1002). In some examples, the spring 208 and the clamp 210 are inserted in the first inner space 212 of the second lock portion 124.

The example method 902 of FIG. 10 also includes inserting the second lock portion in a first lock portion while controlling a penetration of a locking head into a guide groove on the first lock portion (block 1004). In some examples, the second lock portion 124 is inserted in the second inner space 302 of the first lock portion 122 while a penetration of the clamp 210 into the guide groove 220 is controlled.

The example method 902 of FIG. 10 also includes axially fixing the second lock portion relative to the first lock portion via a locking ring (block 1006). In some examples, the second lock portion 124 is axially fixed relative to the first lock portion 122, for example, via the locking member 214.

The example method 902 of FIG. 10 also includes coupling a lever to the second lock portion (block 1008). In some examples, the lever 228 is coupled to the second lock portion 124, for example, via the fastener 230.

The example method 902 of FIG. 10 also includes coupling the first lock portion to a wing of the drone assembly (block 1010). In some examples, the first lock portion 122 is coupled to the first wing 102, for example, via the bracket 616.

The example method 902 of FIG. 10 also includes determining whether to provide another lock (block 1012). In some examples, if another lock is desired (e.g., the second lock 116) (block 1012: YES), control of the example method 902 of FIG. 10 returns to block 1002. On the other hand, in some examples, if another lock is not desired (block 1012: NO), control of the example method 902 of FIG. 10 returns to the example method 900 of FIG. 9.

Although the example method 902 is described in connection with the flowchart of FIG. 10, other methods of implementing the lock(s) 106, 116 of the drone assembly 101 may be alternatively used. For example, the order of execution of the blocks 1002, 1004, 1006, 1008, 1010, 1012 may be changed, and/or some of the blocks 1002, 1004, 1006, 1008, 1010, 1012 described may be changed, eliminated, or combined.

Figure 11:
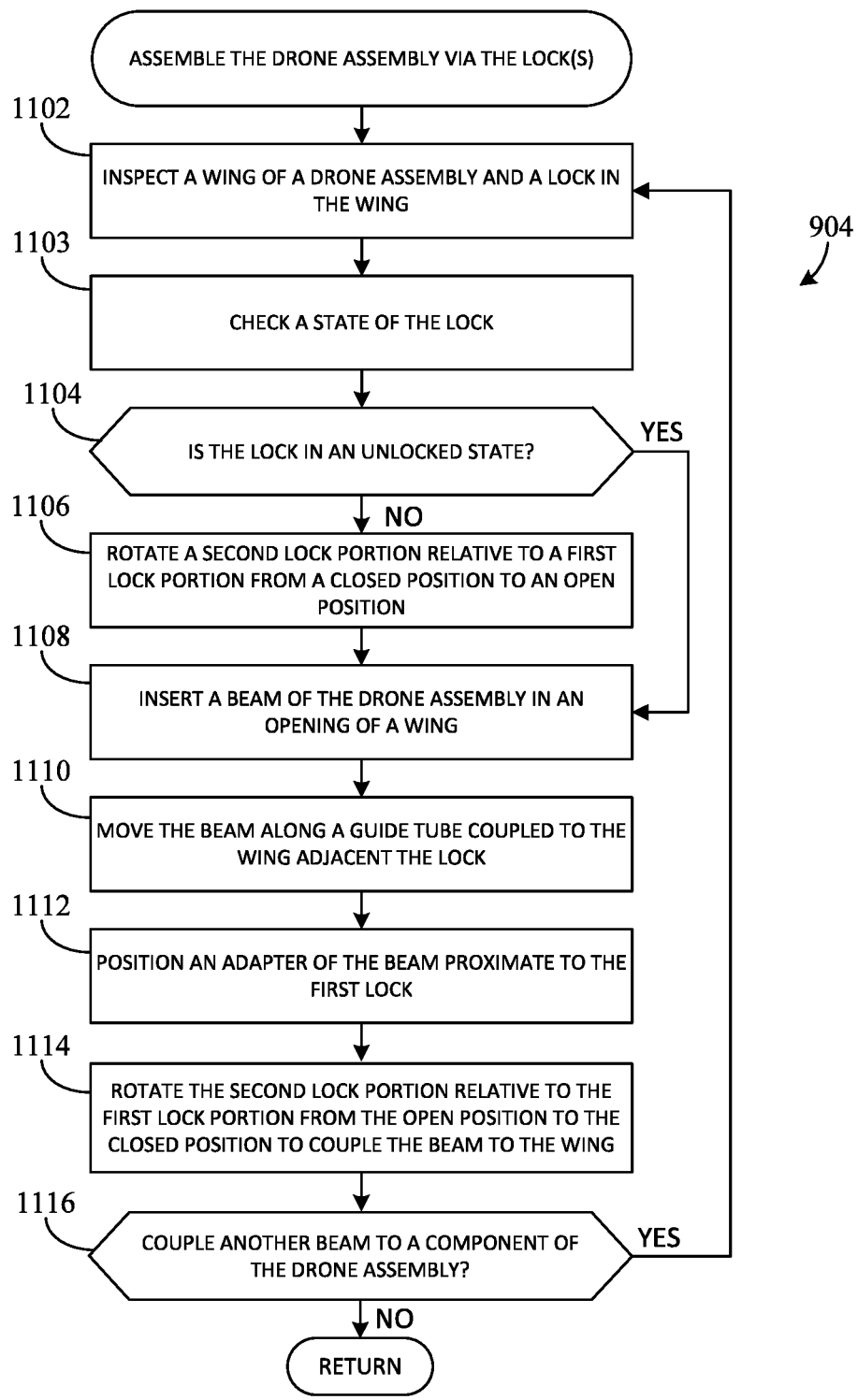

FIG. 11 is another flowchart representative of another example method 904 that can be executed to implement one or more examples disclosed herein. The example method 904 of FIG. 11 can be implemented in any of the example drone 100 of FIGS. 1A and 6-8 and/or the example drone assembly 101 of FIGS. 1A, 1B, and 6-8. Example operations of blocks 1102, 1103, 1104, 1106, 1108, 1110, 1112, 1114, 1116 may be used to implement block 904 of FIG. 9. In particular, the example method 904 of FIG. 11 is effective in assembling a drone or a portion thereof in accordance with the teachings of this disclosure.

The example method 904 of FIG. 11 begins by inspecting a wing of a drone assembly and a lock in the wing (block 1102). In some examples, the first wing 102 and the first lock 106 therein are inspected, for example, visually by one or more users.

The example method 904 of FIG. 11 includes checking a state of the lock (block 1103). In some examples, the state of the first lock 106 is checked. The state of the first lock 106 is indicated, for example, by a position and/or an orientation of the lever 228 relative to the first wing 102.

The example method 904 of FIG. 11 also includes determining whether the lock is in an unlocked state (block 1104). In some examples, if the first lock 106 is determined to be in the unlocked state based on the check performed in connection with block 1103 (block 1104: YES), control of the example method 904 of FIG. 11 proceeds to block 1108. On the other hand, in some examples, if the first lock 106 is determined to be in the locked state based on the check performed in connection with block 1103 (block 1104: NO), control of the example method 904 of FIG. 11 proceeds to block 1106.

The example method 904 of FIG. 11 also includes rotating a second lock portion relative to a first lock portion from a closed position to an open position (block 1106). In some examples, the second lock portion 124 rotates relative to the first lock portion 122 about the second axis 202 from the second position to the first position, for example, by applying the torque 125 to the second lock portion 124. In such examples, such rotation is to occur prior to inserting the first beam 104 in the primary opening 602 if the first lock portion 122 is in an initial position that is different from the first position.

The example method 904 of FIG. 11 also includes inserting a beam of the drone assembly in an opening of a wing (block 1108). In some examples, the first beam 104 is inserted in the primary opening 602 of the first wing 102.

The example method 904 of FIG. 11 also includes moving the beam along a guide tube coupled to the wing adjacent the lock (block 1110). In some examples, the first beam 104 moves along the guide tube 608 in the third direction 612, which provides guidance to the first beam 104 as the adapter 118 approaches the first lock 106.

The example method 904 of FIG. 11 also positioning an adapter associated with the beam proximate to the lock (block 1112). In some examples, the adapter 118 is positioned proximate to the first lock 106 or the second portion 124 thereof. In such examples, the adapter 118 can pass through the slot 126 of the second lock portion 124 while the second lock portion 124 is in the first position.

The example method 904 of FIG. 11 also includes rotating the second lock portion relative to the first lock portion from the open position to the closed position to couple the beam to the wing (block 1114). In some examples, the second lock portion 124 rotates relative to the first lock portion 122 about the axis 202 from the first position to the second position to couple the first beam 104 to the first wing 102, for example, by applying the torque 125 to the second lock portion 124.

The example method 904 of FIG. 11 also includes determining whether to couple another beam to a component of the drone assembly (block 1116). In some examples, if the second beam 114 is decoupled from the second wing 112 (block 1116: YES), control of the example method 904 of FIG. 11 returns to block 1102. On the other hand, in some examples, if the second beam 114 is coupled to the second wing 112 via the second lock 116 (block 1116: NO), control of the example method 904 of FIG. 11 returns to the example method 900 of FIG. 9.

Although the example method 904 is described in connection with the flowchart of FIG. 11, other methods of implementing the example drone 100 and/or the example drone assembly 101 may be alternatively used. For example, the order of execution of the blocks 1102, 1103, 1104, 1106, 1108, 1110, 1112, 1114, 1116 may be changed, and/or some of the blocks 1102, 1103, 1104, 1106, 1108, 1110, 1112, 1114, 1116 described may be changed, eliminated, or combined.

Figure 12:
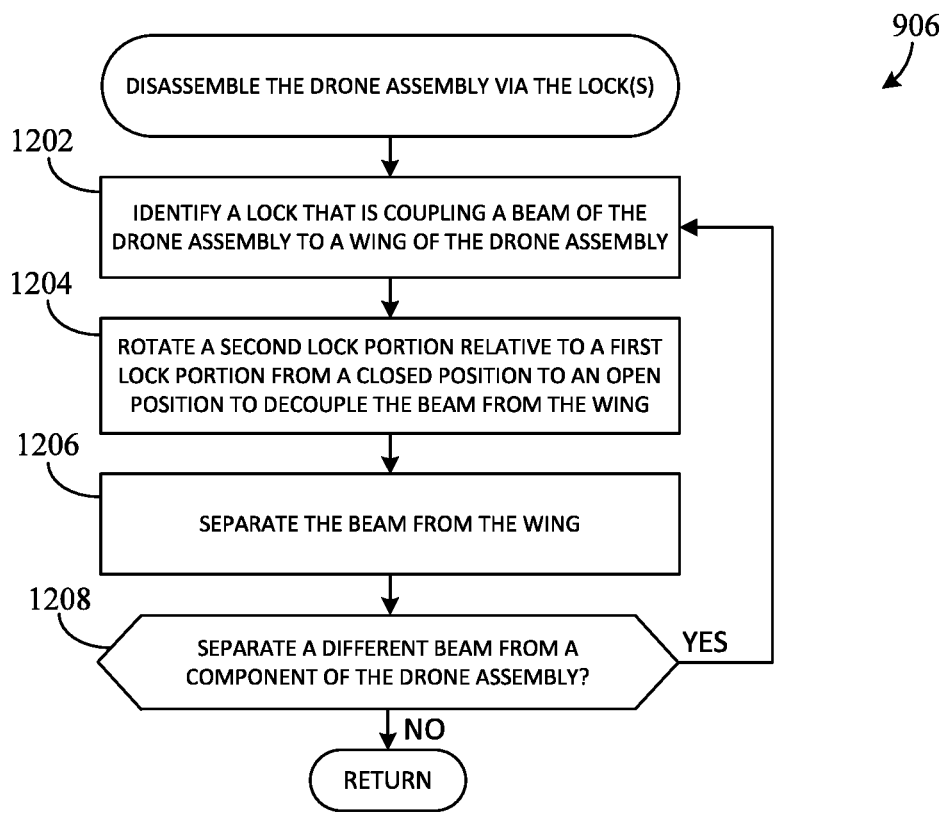

FIG. 12 is another flowchart representative of another example method 906 that can be executed to implement one or more examples disclosed herein. The example method 906 of FIG. 12 can be implemented in any of the example drone 100 of FIGS. 1A and 6-8 and/or the example drone assembly 101 of FIGS. 1A, 1B, and 6-8. Example operations of blocks 1202, 1204, 1206, 1208 may be used to implement block 906 of FIG. 9. In particular, the example method 906 of FIG. 12 is effective in disassembling a drone or a portion thereof in accordance with the teachings of this disclosure.

The example method 906 of FIG. 12 begins by identifying a lock that is coupling a beam of the drone assembly to a wing of the drone assembly (block 1202). In some examples, the first lock 106 is identified.

The example method 906 of FIG. 12 also includes rotating a second lock portion relative to a first lock portion from a closed position to an open position to decouple the beam from the wing (block 1204). In some examples, the second lock portion 124 rotates relative to the first lock portion 122 about the axis 202 from the second position to the first position to decouple the first beam 104 from the first wing 102, for example, by applying the torque 125 to the second lock portion 124.

The example method 906 of FIG. 12 also includes separating the beam from the wing (block 1206). In some examples, the first beam 104 separates from the first wing 102 (e.g., see FIG. 6).

The example method 906 of FIG. 12 also includes determining whether to separate a different beam from a component of the drone assembly (block 1208). In some examples, if the second beam 114 is coupled to the second wing 112 via the second lock 116 (block 1208: YES), control of the example method 906 of FIG. 12 returns to block 1202. On the other hand, in some examples, if the second beam 114 is separated from the second wing 112 (block 1208: NO), control of the example method 906 of FIG. 12 returns to the example method 900 of FIG. 9.

Although the example method 906 is described in connection with the flowchart of FIG. 12, other methods of implementing the example drone 100 and/or the example drone assembly 101 may be alternatively used. For example, the order of execution of the blocks 1202, 1204, 1206, 1208 may be changed, and/or some of the blocks 1202, 1204, 1206, 1208 described may be changed, eliminated, or combined.

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the apparatus, systems, and methods disclosed in the foregoing description provide numerous advantages. Examples disclosed herein provide a compact, lightweight solution that enables one or more users to easily assemble and/or disassemble a drone or a portion thereof. Disclosed examples reduce design complexity typically associated with drones and, as a result, reduce potential user error(s) during assembly as well as time taken to assemble a drone.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A drone assembly, comprising:
    a wing;
    a keel-beam;
    an adapter positioned on an end of the keel-beam; and
    a lock configured to receive the adapter, the lock comprising a first lock portion coupled to the wing and a second lock portion rotatable relative to the first lock portion between a first position and a second position, wherein
    the lock is configured to (a) couple the keel-beam to the wing when the second lock portion is in the second position and (b) decouple the keel-beam from the wing when the second lock portion is in the first position,
    the first lock portion comprises an inner space in which the second lock portion is positioned,
    the second lock portion comprises a spring cavity extending at least partially through the second lock portion along an axis, and
    the lock comprises a spring disposed in the spring cavity and a clamp interposed between the spring and the first lock portion, the spring urging the clamp into engagement with the first lock portion to resist rotational displacement of the second lock portion relative to the first lock portion.

2. The drone assembly of claim 1, wherein the adapter comprises a hook configured to engage the second lock portion when the second lock portion is in the second position.

3. The drone assembly of claim 2, wherein:
    the second lock portion forms a slot extending transversely through the second lock portion, and
    the hook is movable through the slot when the second lock portion is in the first position.

4. The drone assembly of claim 1, wherein the lock comprises a locking ring operatively coupled between the first lock portion and the second lock portion, the locking ring configured to engage the first and second lock portions to resist axial displacement of the second lock portion relative to the first lock portion.

5. The drone assembly of claim 1, wherein the first lock portion forms a guide groove configured to guide movement of the clamp, the clamp configured to slide through the guide groove between a first end of the guide groove and a second end of the guide groove as the second lock portion moves between the first position and the second position.

6. The drone assembly of claim 5, wherein:
    the first and second ends of the guide groove extend deeper into the first lock portion relative to an intermediate portion of the guide groove that is between the first and second ends, and
    the clamp is engaged between the first and second lock portions when the clamp is positioned in the first or second end of the guide groove.

7. The drone assembly of claim 6, wherein the clamp is configured to exit the first or second end of the guide groove when a torque applied to the second lock portion is equal to or greater than a required torque.

8. The drone assembly of claim 1, wherein the lock comprises a lever coupled to the second lock portion and extending radially outward relative to a rotation axis, actuation of the lever changing a position of the second lock portion.

9. The drone assembly of claim 8, wherein the first and second lock portions are internal to the wing and the lever is external to the wing.

10. The drone assembly of claim 1, wherein the second lock portion is rotatable across an angle that is substantially 180 degrees from the first position to the second position.

11. The drone assembly of claim 1, further comprising a guide tube coupled to the wing and interposed between the lock and an opening formed by the wing, the guide tube configured to guide the keel-beam as the adapter moves through the guide tube from the opening to the lock.

12. A lock mechanism for a drone, comprising:
an adapter coupled to a first component of the drone; and
a lock comprising a first portion positioned in a second component of the drone and a second portion rotatably coupled to the first portion, the second portion configured to engage the adapter and disengage from the adapter based on a position of the second portion relative to the first portion, wherein
rotation of the second portion of the lock relative to the first portion changes the lock between (a) a first state in which the lock couples the first component to the second component and (b) a second state in which the lock decouples the first component from the second component,
the first portion comprises an inner space in which the second portion is positioned,
the second portion comprises a spring cavity extending at least partially through the second portion along an axis, and
the lock comprises a spring disposed in the spring cavity and a clamp interposed between the spring and the first portion, the spring urging the clamp into engagement with the first portion to resist rotational displacement of the second portion relative to the first portion.

13. The lock mechanism of claim 12, wherein the second portion of the lock is rotatable relative to the first portion of the lock between a first position and a second position, the second portion being substantially immobile relative to the first portion in the first and second positions.

14. The lock mechanism of claim 12, wherein the lock comprises a lever coupled to the second portion of the lock and extending radially outward relative to a rotation axis, actuation of the lever changing the state of the lock.

15. The lock mechanism of claim 14, wherein the lever is external to the second component of the drone.

16. A method, comprising:
inserting a keel-beam in an opening formed by a wing of a drone assembly;
positioning an adapter positioned on an end of the keel-beam proximate to a lock, the lock comprising a first portion coupled to the wing of the drone assembly, and a second portion rotatable relative to the first portion between an open position and a closed position, the lock being configured to (a) couple the keel-beam to the wing when the second portion is in the closed position and (b) decouple the keel-beam from the wing when the second portion is in the open position; and
rotating the first portion of the lock relative to the second portion of the lock from the open position to the closed position to couple the keel-beam to the wing, wherein
the first portion comprises an inner space in which the second portion is positioned,
the second portion comprises a spring cavity extending at least partially through the second portion along an axis, and
the lock comprises a spring disposed in the spring cavity and a clamp interposed between the spring and the first portion, the spring urging the clamp into engagement with the first portion to resist rotational displacement of the second portion relative to the first portion.

17. The method of claim 16, further comprising:
checking a state of the lock, and
if the first portion of the lock is in an initial position that is different from the open position, rotating the first portion of the lock relative to the second portion from the initial position to the open position prior to inserting the keel-beam in the opening.

18. The method of claim 16, further comprising rotating the first portion of the lock relative to the second portion of the lock from the closed position to the open position to decouple the keel-beam from the wing.

\* \* \* \* \*